United States Patent
Bernal et al.

(10) Patent No.: US 10,909,845 B2
(45) Date of Patent: Feb. 2, 2021

(54) SYSTEM AND METHOD FOR ENHANCING IMAGES AND VIDEO FRAMES

(71) Applicant: Conduent Business Services, LLC, Dallas, TX (US)

(72) Inventors: Edgar A. Bernal, Webster, NY (US); Wencheng Wu, Webster, NY (US)

(73) Assignee: Conduent Business Services, LLC, Florham Park, NJ (US)

( * ) Notice: Subject to any disclaimer, the term of this patent is extended or adjusted under 35 U.S.C. 154(b) by 801 days.

(21) Appl. No.: 13/932,453

(22) Filed: Jul. 1, 2013

(65) Prior Publication Data
US 2015/0002745 A1    Jan. 1, 2015

(51) Int. Cl.
*H04N 5/235*  (2006.01)
*G06T 5/00*  (2006.01)
(Continued)

(52) U.S. Cl.
CPC ....... *G08G 1/0175* (2013.01); *G06K 9/00785* (2013.01); *G06T 5/001* (2013.01);
(Continued)

(58) Field of Classification Search
CPC ........... G06T 2207/30236; G06T 5/002; G06T 5/003
(Continued)

(56) References Cited

U.S. PATENT DOCUMENTS 5,880,682 A * 3/1999 Soulliard ............... G08G 1/042
324/207.13
6,121,898 A   9/2000 Moetteli
(Continued)

FOREIGN PATENT DOCUMENTS

EP        1 486 928 B1    4/2011
WO    WO 2009156329 A1 * 12/2009   ......... H04N 5/23232
WO    WO-2009156329 A1 * 12/2009   ........... H04N 5/2355

OTHER PUBLICATIONS

"Real Time Speed Estimation of Moving Vehicles from Side View Images from an Uncalibrated Video Camera"—Sedat Doğan, Mahir Serhan Temiz, St| k| Külür; Sensors 2010, 10, 4805-4824; doi:10.3390/s100504805 (Year: 2010).*

(Continued)

*Primary Examiner* — Mainul Hasan
(74) *Attorney, Agent, or Firm* — Ortiz & Lopez, PLLC; Luis M. Ortiz; Kermit D. Lopez

(57) ABSTRACT

A system and method for performing vehicle-velocity aware image enhancement. Embodiments generally include a video capture module configured to receive image data of the scene being monitored, an image extraction module configured to extract still images from incoming video data, a vehicle detection module that detects the approximate location of a target vehicle in the scene being monitored, a velocity determination module configured to determine the amplitude and direction of a vector that describes the velocity of the target vehicle in image pixel coordinates, and a velocity-aware enhancing module configured to enhance the image(s) of the target vehicle extracted from the video feed based on the vehicle's velocity. Embodiments may also include an infraction detection module configured to detect the occurrence of a violation of traffic law(s) by a target vehicle.

12 Claims, 5 Drawing Sheets

(51) Int. Cl.
    *H04N 7/18*         (2006.01)
    *G08G 1/017*       (2006.01)
    *G06K 9/00*        (2006.01)
    *G08G 1/052*       (2006.01)
    *G08G 1/04*        (2006.01)

(52) U.S. Cl.
    CPC ............... *G08G 1/04* (2013.01); *G08G 1/052* (2013.01); *G06T 2207/30236* (2013.01); *G06T 2207/30252* (2013.01)

(58) Field of Classification Search
    USPC ........................................................ 348/148
    See application file for complete search history.

(56) References Cited

U.S. PATENT DOCUMENTS

| | | | |
|---|---|---|---|
| 6,690,294 B1* | 2/2004 | Zierden | G08G 1/052 340/933 |
| 8,260,553 B2 | 9/2012 | Matsur | |
| 8,363,102 B1 | 1/2013 | Kadoch et al. | |
| 2004/0252193 A1* | 12/2004 | Higgins | G08G 1/042 348/149 |
| 2005/0019000 A1* | 1/2005 | Lim | G06T 3/4069 386/209 |
| 2006/0177145 A1* | 8/2006 | Lee | G06T 5/003 382/255 |
| 2007/0276600 A1* | 11/2007 | King | G08G 1/166 701/301 |
| 2007/0290886 A1* | 12/2007 | Stam | B60Q 9/00 340/907 |
| 2008/0166023 A1* | 7/2008 | Wang | G08G 1/054 382/107 |
| 2009/0208054 A1* | 8/2009 | Angell | G06Q 90/00 382/103 |
| 2010/0246989 A1* | 9/2010 | Agrawal | G06T 5/20 382/255 |
| 2010/0272356 A1* | 10/2010 | Hong | H04N 5/23229 382/170 |
| 2011/0106416 A1* | 5/2011 | Scofield | G08G 1/0104 701/119 |
| 2011/0234749 A1 | 9/2011 | Alon | |
| 2011/0246210 A1 | 10/2011 | Matsur | |
| 2012/0287278 A1 | 11/2012 | Danis | |
| 2013/0170765 A1* | 7/2013 | Santos | G06T 5/003 382/255 |

OTHER PUBLICATIONS

U.S. Appl. No. 13/411,032, filed Mar. 2, 2012, Kozitsky et al.
U.S. Appl. No. 13/613,174, filed Sep. 13, 2012, Bemal et al.
Ihaddadene, N. et al., "Real-time Crowd Motion Analysis," Comput. Sci. Labl. Of Lille (LIFL) (2008) Univ. of Sci. & Technol. of Lille—France, Lille, France, 4 pages.
Kundur, D. et al., "Blind Image Deconvolution," IEEE Signal Processing Magazine (May 1996), 13(3):43-64.

* cited by examiner

SYSTEM AND METHOD FOR ENHANCING IMAGES AND VIDEO FRAMES

FIELD OF THE INVENTION

Embodiments are generally related to image enhancement. Embodiments are further related to enhancement of images obtained from video. Embodiments are also related to vehicle-velocity aware image enhancement.

BACKGROUND

Many current and future traffic enforcement applications involve the acquisition of evidentiary images. These applications include, but are not limited to, automated toll management, red-light and stop-sign enforcement, parking, speed enforcement, and vehicle-of-interest identification. The quality of the evidentiary images is important in avoiding case dismissals and reducing frivolous defendant contests. Additionally, the performance of automated algorithms such as automated license plate recognition (ALPR) largely depends on the quality of the digital imagery. Current traffic monitoring systems typically include a still image camera that acquires evidentiary images of violators in response to a signal from a violation detector such as an in-ground sensor (in the case of red light enforcement) or speed measurement sensor (in the case of speed enforcement). While such systems are effective at their respective enforcement tasks, their range of applications is limited since images of the monitored scene are only captured when violations are detected. There are currently inexpensive surveillance video cameras which could support multiple applications and provide continuous monitoring; however, the video data of such cameras do not satisfy the image quality requirements for evidentiary images in the aforementioned speed enforcement tasks.

Thus, a need exists for solutions that can satisfy the requirements of multiple applications simultaneously (e.g., speed detection, vehicle count for traffic condition monitoring, surveillance, anomaly detection, etc.) using inexpensive video cameras and which would result in significant cost and complexity savings for obtaining images of evidentiary quality.

SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for a system and method for enhancing an image which includes an image capture module capable of obtaining video data, an image extraction module for extracting at least one image from said video data, a vehicle detection module for detecting a location of a target vehicle within said at least one image, and a vehicle-velocity aware enhancement module for enhancing said at least one image based on a velocity of said target vehicle.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Unnecessary detail of known functions and operations may be omitted from the current description so as not to obscure the present invention. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
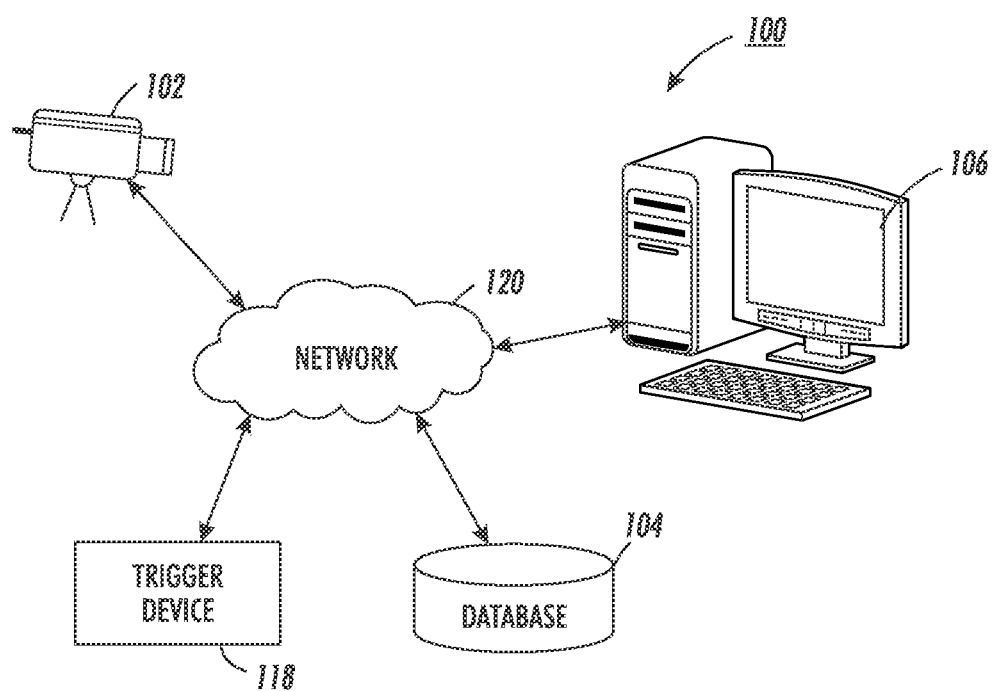
FIG. 1 illustrates a system for performing vehicle-velocity-aware image enhancement, in accordance with the disclosed embodiments.

FIG. 1 illustrates a system 100 for performing vehicle-velocity-aware image enhancement. The system 100 consists of at least an image capture device 102 being operably connected to a data processing device 106 capable of executing modules and being operably connected to a database 104 via a network 120, or other wired or wireless means of connection. The image capture device 102 may be a camera, video camera, infrared camera or any other device capable of capturing images of a still or moving target. The system 100 may also include a trigger device 118 operably connected to the image capture device 102 and/or data processing system. The trigger device 118 can be configured to indicate when certain events have occurred in the monitoring area such as a vehicle exceeding the speed limit or failing to stop at a red light. The trigger device 118 may be implemented as an inductive loop detector embedded in a roadway, a magnetometer detector, a video detector, a laser based detector, a microwave detector, or any other device configured to detect a specified event within the monitoring area.

Figure 2:
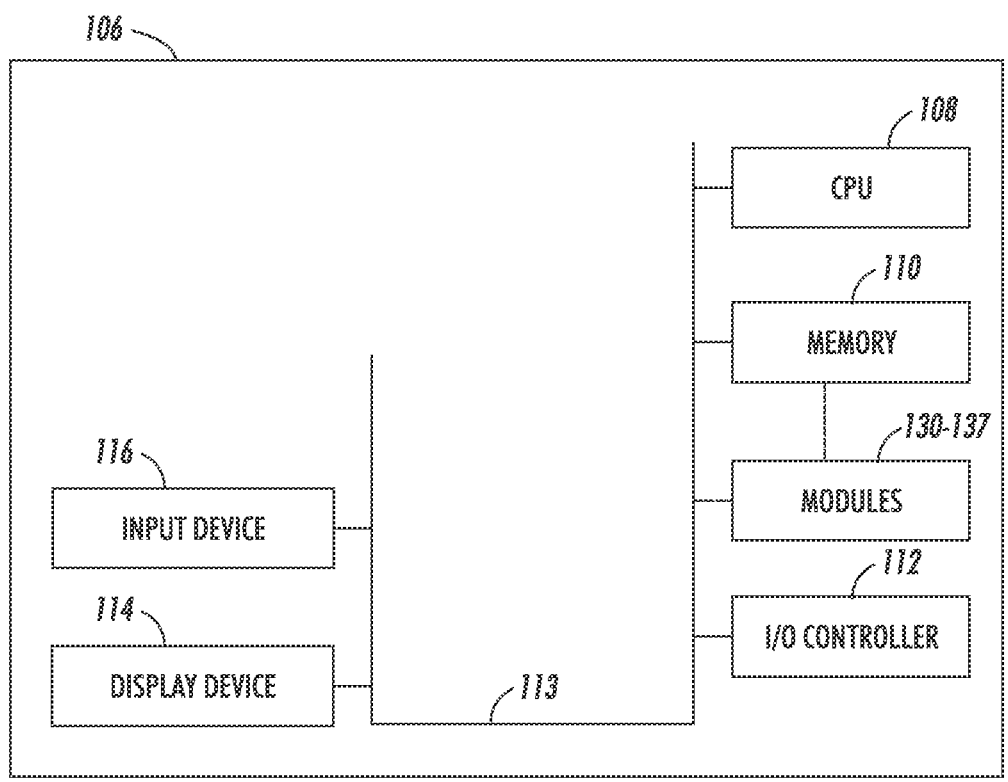
FIG. 2 illustrates a block diagram of a data-processing system that embodiments may be adapted for use with, in accordance with the disclosed embodiments.

FIG. 2 illustrates a block diagram of a data-processing system 106 that embodiments may be adapted for use with. The system 106 comprises a central processor 108, a main memory 110, and an input/output controller 112. The data-processing system 106 may optionally include an input device 116 (e.g., a mouse, track ball, keyboard, touch screen, etc.) and a display device 114. As illustrated, the various components of the data-processing system 106 communicate through a system bus 113 or similar architecture. Embodiments of such a data-processing system may include personal computers, laptops, netbooks, tablets, cellular phones or any device having data-processing and networking capabilities. It should be appreciated that FIG. 2 is only exemplary and is not intended to assert or imply any limitation with regard to the environments in which aspects or embodiments can be implemented. Many modifications to the depicted environments can be made without departing from the spirit and scope of the disclosed embodiments.

The embodiments described herein can be implemented in the context of a host operating system on the data processing system 106 and one or more modules 130-137. Such modules may constitute hardware modules such as, for example, electronic components of a computer system. Such modules may also constitute software modules. In the computer programming arts, a software "module" can be typically implemented as a collection of routines and data structures that performs particular tasks or implements a particular abstract data type.

Software modules generally include instruction media storable within a memory location of a data-processing system and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or methods upon which the module is based. The term "module" as utilized herein can therefore generally refer to software modules or implementations thereof. Such modules can be utilized separately or together to form a program product that can be implemented through non-transitory signal-bearing media including transmission media and/or recordable media.

Embodiments of the systems and methods disclosed herein generally include a video capture module 130 configured to receive image data of the scene being monitored, an image extraction module 131 configured to extract still images from incoming video data, a vehicle detection module 132 that detects the approximate location of a target vehicle in the scene being monitored, a vehicle-velocity determination module 133 configured to determine the amplitude and direction of a vector that describes the velocity of the target vehicle in image pixel coordinates, and a vehicle-velocity-aware enhancing module 134 configured to enhance the image(s) of the target vehicle extracted from the video feed based on the vehicle's speed, direction of motion, location within the camera view and image capture parameters. Enhancement can take one of multiple forms such as sharpening/de-blurring, denoising, and upsampling via super-resolution techniques. Systems and methods disclosed herein may also include an infraction detection module 135 configured to detect the occurrence of a violation of traffic law(s) by a target vehicle in the area being monitored.

Figure 3:
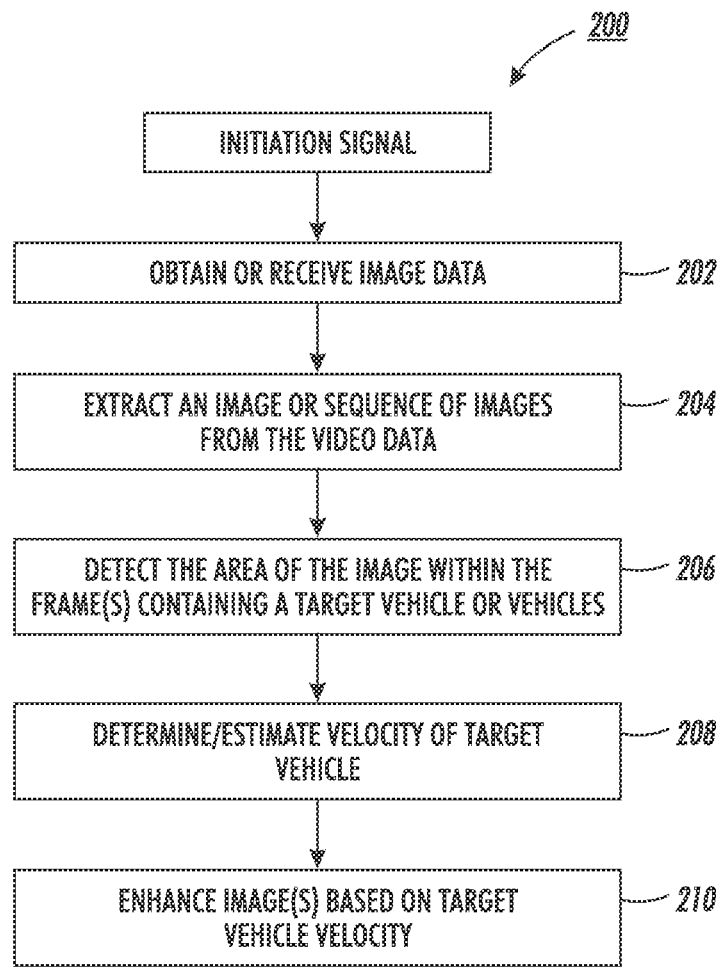
FIG. 3 illustrates a high-level flow chart of an exemplary method of vehicle-velocity-aware image enhancement, in accordance with the disclosed embodiments.

FIG. 3 illustrates a high-level flow chart of an exemplary method 200 of vehicle-velocity-aware image enhancement. Initially, the video acquisition module 130 may obtain or receive image data directly from an image capture device 102 or from previously captured video data stored within a database 104 or memory 110 (Step 202). While no specific requirements in terms of spatial or temporal resolutions are imposed on the video data obtained or received by the video acquisition module 130, traditional surveillance cameras are typically internet protocol (IP) cameras with pixel resolutions of video graphics arrays (VGA) above 640×480 pixels and frame rates of 15 fps and above. The exposure times of each video frame are relevant to the disclosed embodiments as the amount of blur will directly depend on the length of the exposure intervals (in addition to vehicle speed and camera configuration). Note also that the exposure times are upper bounded by the frame rate, although they are typically smaller than the upper bound because time must be allowed to read frame data out. For example, the largest exposure time per frame for a 60 fps video camera is $\frac{1}{60}$ s, and a typical exposure time would range between $\frac{1}{500}$ s and $\frac{1}{120}$ s. While shorter exposure times can ameliorate the effect of motion blur, smaller integration times at the pixel level imply smaller amounts of light being captured by the sensor, which results in lower signal-to-noise ratio (SNR) and can lead to underexposed and unusable images, particularly when the intent is to use them for evidentiary purposes.

Figure 4:
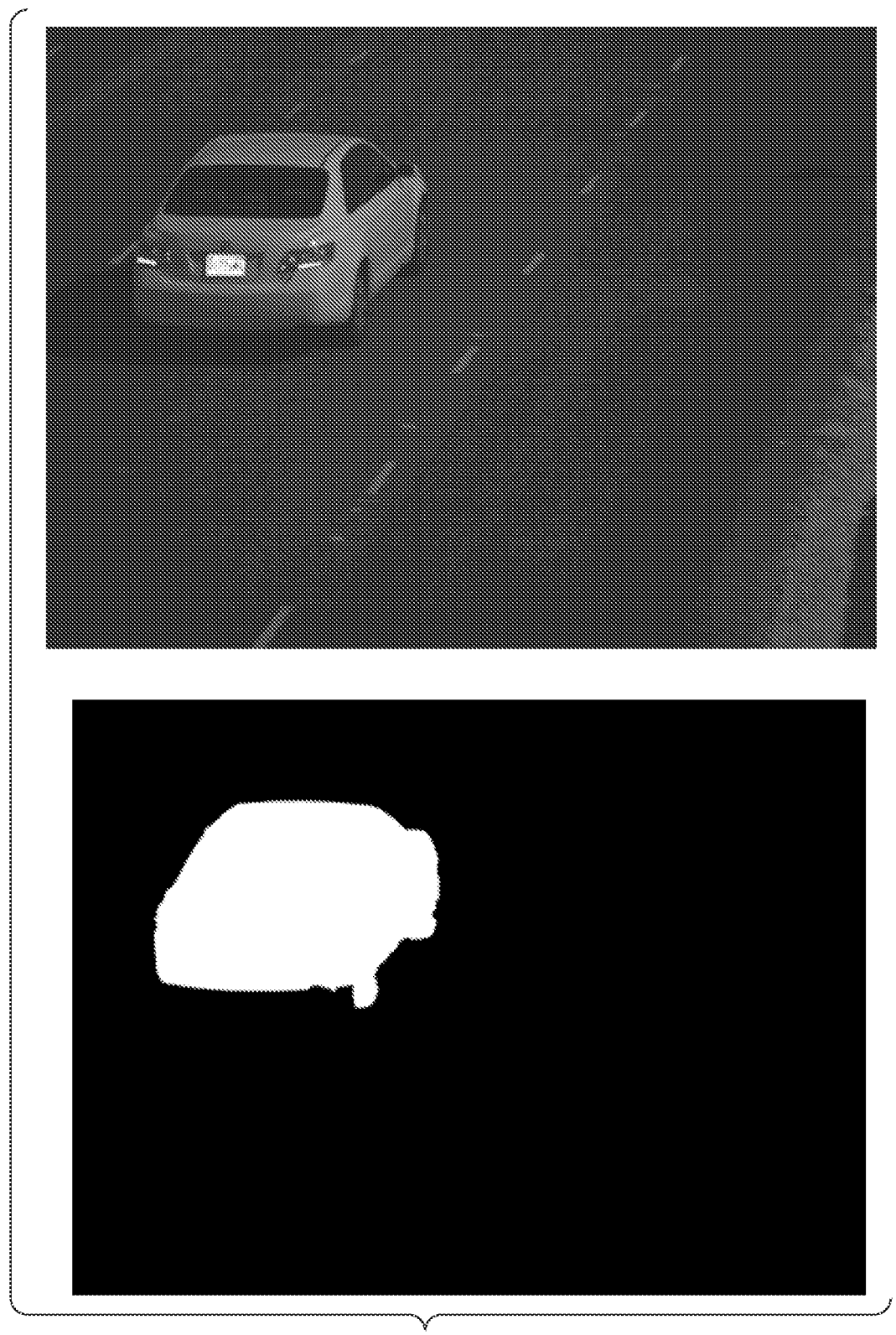
FIG. 4 illustrates an example video frame and corresponding binary mask indicating the location of the vehicle in motion, in accordance with the disclosed embodiments.

Next, upon receiving a signal from the infraction detection module 135 or other initiation signal, the image extraction module 131 can extract an image or sequence of images from the video data (Step 204). The vehicle detection module 132 may then detect the area of the image containing a target vehicle or vehicles (Step 206). Detection may be accomplished via foreground and/or motion detection techniques such as background estimation and subtraction, temporal double differencing and optical flow. Alternatively, non-video-based triggering devices already in the system such as an inductive loop detector embedded in a roadway, a magnetometer detector, a laser based detector or a microwave detector are capable of relaying vehicle location information, usually in real-world coordinates. Camera calibration techniques described herein can then be used to map this location information into pixel coordinates. The output of the vehicle detection module 132 is generally a binary mask with ON pixels at locations corresponding to the target vehicle(s), and OFF pixels elsewhere. Morphological operations may be utilized in the removal of spurious sources of motion and noise. FIG. 4 shows an example video frame the corresponding binary mask where ON pixels indicate the location of the vehicle in motion, according to a double frame differencing technique.

Vehicle-velocity estimation can then be performed by the vehicle-velocity determination module 133 from the frame or sequence of frames (Step 208) and may also utilize information provided by or obtained from an external speed measurement device. Both speed and direction of motion are typically determined in the image domain so that enhancements can be applied appropriately. Vehicle-velocity estimation may be performed by employing an image domain approach or an external speed measurement device approach.

The image domain approach utilizes the output from the image extraction module 131 and the vehicle detection module 132 and applies feature tracking, optical flow or block matching algorithms in order to determine a vector field that describes the displacement of the target vehicle across the sequence of frames. The magnitude of the vectors in this field corresponds to the speed of the vehicle, in pixels, and the direction of the vectors in the field corresponds to the direction of motion of the vehicle in the image domain. Note that this approach is significantly less complex than approaches previously proposed for speed estimation from video as prior approaches require knowledge of camera calibration in order to map pixel coordinates to real-world coordinates. For the disclosed embodiments, approximate knowledge of velocity of the vehicle in pixel coordinates is sufficient for image enhancement as performed by the disclosed embodiments.

Figure 5:
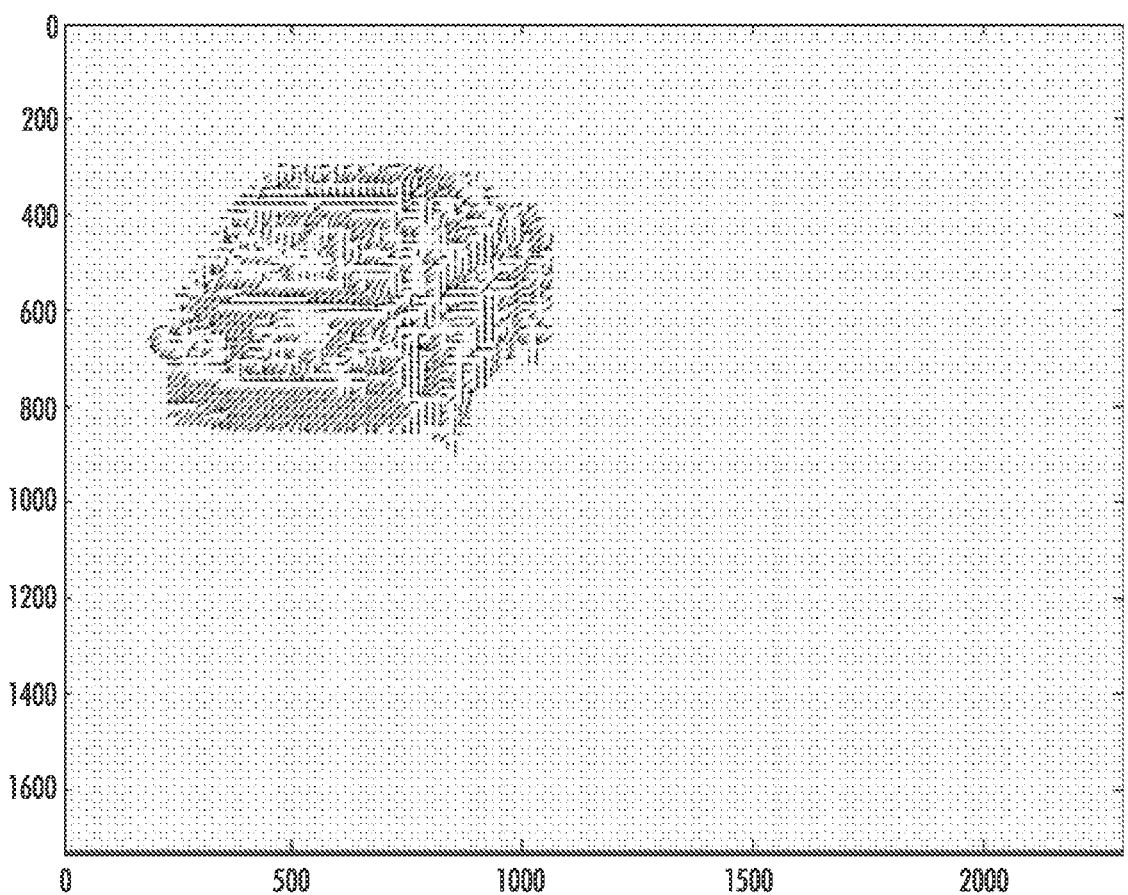
FIG. 5 illustrates a vector field associated with a vehicle in motion, in accordance with the disclosed embodiments.

According to one embodiment, every pixel that has been associated with a vehicle in motion, for example, as per the procedure illustrated by FIG. 4, will have an associated motion vector describing the displacement the particular pixel underwent in the time elapsed between the instant where previous frame was acquired and the instant where the current frame was acquired. The inverse of that length of time is typically referred to as frame rate f and is usually expressed in terms of frames per second or fps. FIG. 5 illustrates one such vector field associated with the vehicle in motion from FIG. 4. This vector field can be computed in multiple ways, including via optical flow, block matching, and tracking techniques. Note that these techniques are well-suited to find displacements of image features that are salient, such as edges and corners, and may not perform as well for smooth image areas where correspondences are more difficult to find; this is completely acceptable in the context of this application, as long as the displacement vector for a smooth or textureless area matches it with smooth area in an adjacent frame that is similar in appearance. For a pixel located on row r and column c of frame n in the incoming video stream that has been detected to be part of a vehicle in motion, there is an associated displacement vector that describes the displacement of the vehicle image associated with that pixel between frames n and n−1, namely, vector $d=(x_{cr}, y_{cr})$.

In practice, this means that the vehicle area captured by that pixel moved with instantaneous velocity approximately equal to $v=d/f=(x_{cr}/f, y_{cr}/f)$ between frames n and n−1. If each frame is captured with exposure time e, where e is upper bounded by 1/f, that is, e≤1/f, then the vector describing the effective linear motion blur affecting the capture of that particular pixel is $b=ev=(ex_{cr}/f, ey_{cr}/f)$. This approach operates on the underlying assumption that the motion of the vehicle between frames can be accurately described as spatially-varying and linear. Other types of motion can be considered such as rotational (e.g., to describe the blur caused by the turning of the wheels) and non-linear (e.g., when the exposure time is long enough that significant changes in vehicle speed are expected to introduce non-linearities in the blurring process).

The external speed measurement device approach is particularly well-suited for speed enforcement systems with dedicated speed measurement devices as this approach requires the camera calibration to be known a priori in order to map the measured speed in real-world units (km/h or m/h) to pixel locations. Since speed enforcement devices only measure the magnitude of the velocity, the direction of motion must be determined or estimated. As such, this approach comprises two sub-modules. A speed determination module 136 estimates the speed at which the target vehicle is travelling. This information may be obtained or received from a traditional speed measurement device such as a radar, laser or in-ground-loop-based system, or it may also be determined from the acquired video data. Once the speed of the vehicle is known, translation from real-world coordinates to pixel coordinates is performed via known camera calibration methods. The direction determination module 137 determines the direction in which the target vehicle is moving. Because vehicles tend to move in highly predictable directions, strategies such as motion heat maps can be implemented to map location within a scene with an expected direction of motion. An example of such motion heat mapping is described in "Real time crowd-motion analysis," N. Ihaddadene and C. Djeraba, Proc. International Conference of Pattern Recognition (2008), incorporated in its entirety herein. Alternatively, lane/road detection algorithms that detect the markers between lane boundaries can be used for estimating the target vehicle travel direction.

According to one embodiment instead of having frame-to-frame pixel-wise displacements computed via image processing methods (which would provide both the magnitude and the direction of the velocity in pixel units) an overall vehicle speed is available, along with an expected direction of motion. Specifically, the magnitude of the velocity ∥s∥ is available, along with its expected angle or direction <s so that a vectorial representation of velocity $(s_X, s_Y)$ can be obtained by mapping polar to rectilinear coordinates. The inverse of the camera calibration mapping provides a means to convert real-world coordinates (X,Y,Z) to pixel coordinates (r,c) via a projective transform:

$$k \begin{bmatrix} X \\ Y \\ 1 \end{bmatrix} = H_{(z_0, z_1)} \cdot \begin{bmatrix} r \\ c \\ 1 \end{bmatrix}$$

Here, $H_{(Z0,Z1)}$ is a 3×3 matrix that depends on the height of the camera, $Z_0$ relative to the height of the feature associated with pixel location (r,c), $Z_1$ above the road surface, and k is a scaling factor whose value is the inner product between the last row of $H_{(Z0,Z1)}$ and vector $[r\ c\ 1]^T$. Assuming that ratio between $Z_0$ and $Z_1$ is known, and at least one of $Z_0$ and $Z_1$ is known, inverse camera calibration techniques that relate the velocity of the vehicle $(s_X, s_Y)$ in real-world units to the displacement of the vehicle image $d=(x_{cr}, y_{cr})$ associated with pixel coordinates (r,c) can be implemented by solving the system of equations $$k \begin{bmatrix} X \\ Y \\ 1 \end{bmatrix} = H_{(z_0, z_1)} \cdot \begin{bmatrix} r \\ c \\ 1 \end{bmatrix}, \text{ and}$$

$$k' \begin{bmatrix} X - s_x/f \\ Y - s_y/f \\ 1 \end{bmatrix} = H_{(z_0, z_1)} \cdot \begin{bmatrix} r - x_{cr} \\ c - y_{cr} \\ 1 \end{bmatrix}.$$

One can then follow the same derivation discussed above to determine the pixel-wise velocity in pixel units (i.e., $v=(v_{cr}, v_{cr})$ for a pixel located on row r and column c, where knowledge of frame rate is involved). Often times, it is assumed that the height of the feature associated with the image pixel located at (r,c) is negligible relative to the height of the camera, in which case $H_{(Z0,Z1)} \approx H_{(Z0,0)}$. That is, a common $H_{(Z0,0)}$ is used for all vehicles. However, for better accuracy, the height of the features $Z_1$ each vehicle can also be estimated from at least one frame with said vehicle in sight. One example method to estimate the height of a feature is to first assume that the lowest point of a detected motion blob of said vehicle has zero height, and then use the vertical distance in pixels between said lowest point and the feature point location (r,c) to estimate its height $Z_1$ above the road surface. Another example method is to first detect the tire of the vehicle, assume the contact point between said tire and the road surface has zero height, and then use the vertical distance in pixels between said contact point and the feature point location (r,c) to estimate its height $Z_1$ above the road surface. Yet, another alternative is to assume the physical dimension of a region near the feature point is known (e.g., the feature point is near the license plate and the dimensions of a typical license plate are known) to estimate its height $Z_1$ above the road surface.

If a velocity determination module 133 is not in place, assumptions about the speed and/or direction of the target vehicle can be made according to the speed limit and/or historical speed averages for the area being monitored. Knowledge of the approximate pixel speed and direction at which the vehicle travels can then be shared with the velocity-aware enhancing module 134.

Finally, the velocity-aware enhancing module 134 can adaptively enhance the image(s) of the target vehicle, or portion of the target vehicle, extracted from the video data according to the vehicle speed, direction of motion, location within the camera view, and camera capture parameters such as exposure time (Step 210). Different manners of enhancement can be performed depending on the application needs and the limitations of the camera setup. Velocity-aware de-blurring is one manner of enhancement that consists of sharpening the acquired images based on the pixel-wise vehicle velocity parameters as estimated in pixel units, camera configuration, and exposure times. Recovering both the blur, or "point-spread function" (PSF), and the desired deblurred image from a single blurred input (known as the blind-deconvolution problem) is an inherently ill-posed problem, as the observed blurred image provides only a partial constraint on the solution. Prior knowledge about the image or kernel can disambiguate the potential solutions and make deblurring more tractable. Knowledge of the vehicle velocity vector along with the camera configuration and capture parameters can lead to an estimate of the blurring PSF that can then be used in non-blind deconvolution algorithms, that is, algorithms where the PSF is known to some extent, as discussed in "Blind image deconvolution," D. Kundur and D. Hatzinakos, IEEE Signal Processing Magazine p. 43-64 (May 1996), incorporated in its entirety herein.

According to one embodiment, when the motion is assumed to be linear (i.e., the velocity of the vehicle is assumed to remain more or less constant throughout the exposure period) and spatially varying (e.g., due to perspective effects where points on a rigid body in motion that are farther away from the camera appear to be moving at a different velocity than points that are closer to the camera), each pixel detected to be in motion has an associated PSF that can be used in non-blind deconvolution schemes. In particular, if the vector describing the blur affecting the pixel located on row r and column c of an incoming video frame is $b=(ex_{cr}/f, ey_{cr}/f)$, which can alternatively be expressed in polar coordinates as $b=(\|b\|, <b)$, where $\|b\|$ is the magnitude of b and $<b$ is its angle, then the kernel or PSF h associated with the blur is constructed according to the following procedure: (1) initialize h as an array of ceil($\|b\|$)×ceil($\|b\|$) zeroes if ceil($\|b\|$) is odd or as an array of ceil($\|b\|$)+1×ceil($\|bb\|$)+1 zeroes if ceil($\mu b\|$) is even, where ceil(·) is the operator that rounds to the nearest integer towards infinity; (2) construct an ideal line segment centered at the center position of h with length and angle equal to that of the blur vector; (3) for each location (m,n) in h find its distance perpendicular to the line segment, d(m,n); (4) set h(m,n)=max(1−d(m,n),0); (5) normalize the entries of h so that they add up to 1. Let f denote the available blurred image and let g denote the original, unblurred scene. Then the relationship f(m,n)=g(m,n)*h(m,n) holds, where * denotes the convolution operation; since f and h are known, deblurring consists in recovering g via inverse convolution methods.

In one embodiment, inverse deconvolution is performed in the frequency domain. Let F(u,v), G(u,v), and H(u,v) denote the representations of f(m,n), g(m,n), and h(m,n) respectively in the frequency domain. Then the relationship F(u,v)=G(u,v)H(u,v) holds. Which means that g(m,n) can be obtained from the inverse frequency decomposition of G(u, v)=F(u,v)/H(u,v). In scenarios where, in addition to blur, there is additive noise, that is, f(m,n)=g(m,n)*h(m,n)+η(m, n), where η(m,n) denotes additive noise, the operation that leads to the minimization of the original unblurred image and the recovered unblurred image is given by the inverse frequency decomposition of $G(u,v)=H^*(u,v)S_g(u,v)F(u,v)/[|H^*(u,v)|^2 S_g(u,v)+S_\eta(u,v)]$ where $H^*(u,v)$ denotes the complex conjugate of $H^*(u,v)$, $S_g(u,v)$ denotes the power spectral density of g(m,n) and $S_\eta(u,v)$ denotes the power spectral density of η(m,n). Other deconvolution methods can be applied.

Super-resolution algorithms typically combine multiple images with small amounts of relative motion in order to create a single high resolution image. Super-resolution is typically carried out in two steps, image registration and image reconstruction. Velocity-aware multi-frame super-resolution is another manner of enhancement wherein multiple low-resolution (typically temporally adjacent) frames of the vehicle are captured, and knowledge of the vehicle velocity aids registration of the frames on the higher resolution lattice. Knowledge of the vehicle velocity vector, along with the camera configuration and capture parameters, can lead to an estimate of the relative translation, in pixels, between the low-resolution images of the moving vehicle across adjacent frames, which can then be used to perform image registration prior to performing super-resolution.

Figure 6:
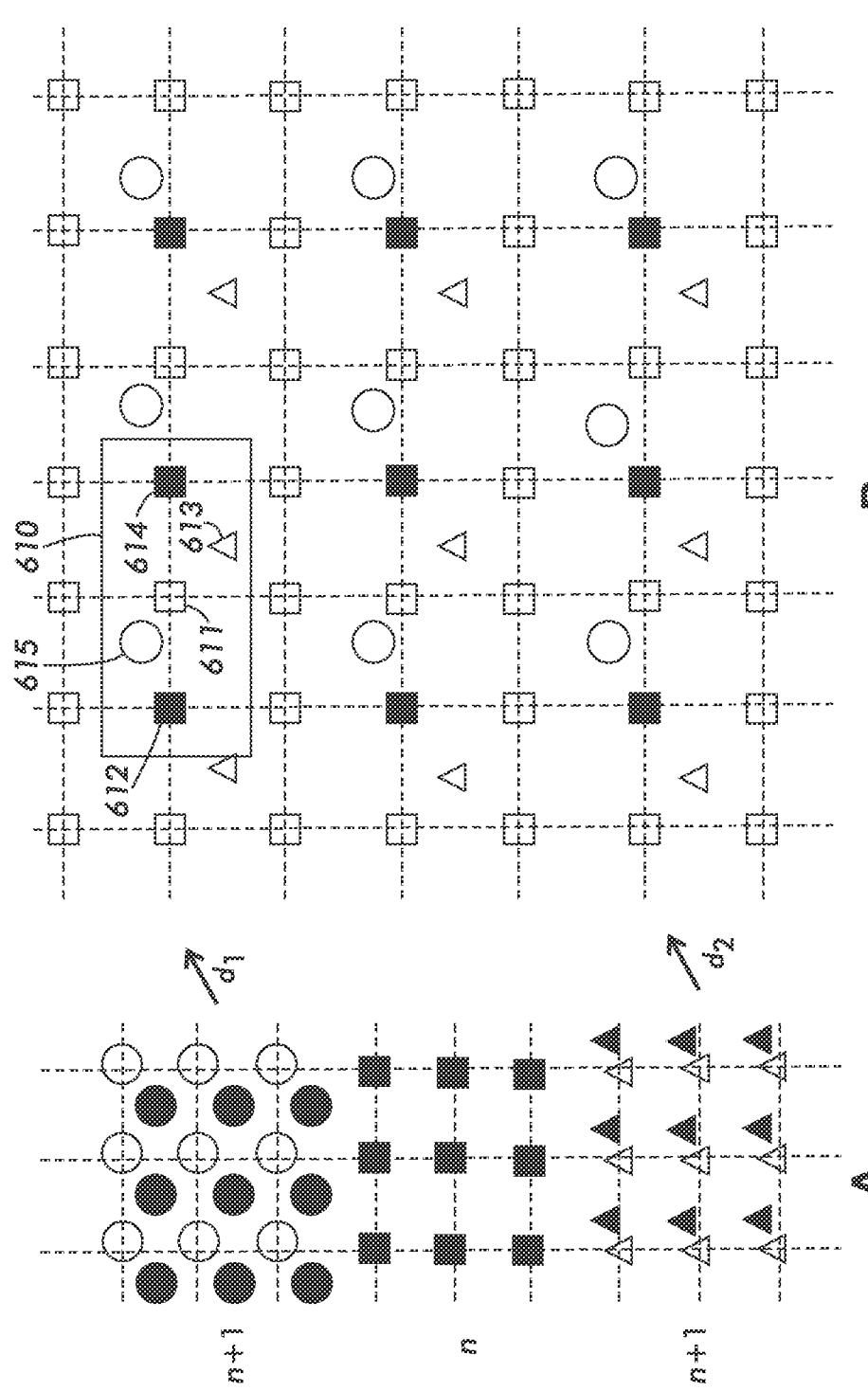
FIGS. 6A-6B illustrate a super-resolution application, in accordance with the disclosed embodiments.

Consider the super-resolution application illustrated in FIGS. 6A-6B, where the temporal progression of 3×3 pixel neighborhood across three frames adjacent in time (namely frames n−1, n and n+1) is considered. In this particular case, a final image with twice the resolution as the individual frame is obtained. With reference to FIG. 6A, displacement vector $d_1$ describes the relative position between like image locations of frame n−1 (solid circles) and frame n (solid squares), while displacement vector $d_2$ describes the relative position between like image locations of frame n (solid squares) and frame n+1 (solid triangles) computed from some known vehicle velocity according to the teachings herein. Note that some image features for which correspondences are found (solid circles and triangles) are not directly measured, and thus have to be inferred from features which are measured, that is, features that fall on the image lattice (empty circles and triangles). Also note that, in order for super-resolution to be effective, the estimated velocity of the vehicle must be such that displacement vectors have non-integer values relative to the lattice on which the video frames at least along the row or the column directions.

As discussed earlier, the attributes of displacement vectors can vary with respect to the spatial location in a frame due to, for example, perspective. Without loss of generality, let us consider the case where the pixel neighborhood in question is small enough and the frame acquisition rate is fast enough that displacement vectors describing the motion of a rigid body are approximately constant with space within the small neighborhood considered in the figure. When larger neighborhoods are considered or when local translations are not completely consistent, higher level transformations that account for translation, rotation, and warping can be considered.

With reference to FIG. 6B, registration of corresponding features (solid circles, squares, and triangles) results in slight displacement of measured features (empty circles and triangles) so that measured features fall outside the low-resolution lattice of the original video frames. Consequently, high-resolution image reconstruction can be achieved by inferring the values of image features that fall on a high-resolution lattice (empty squares) from the known image features (empty circles and triangles and filled squares). Such inference can be achieved via known interpolation, regression, fitting, model- or training-based methods, for example. In one embodiment and with reference to high-resolution image region 610, the value of unknown sample 611 can be inferred from a weighted combination of known values 612, 613, 614, and 615. Other embodiments could consider smaller or larger neighborhoods of known samples. Once the high resolution image is estimated, additional regularization and filtering techniques that enforce reconstruction consistency and sharpness constraints can be employed.

Velocity-aware denoising is yet another manner of enhancement that is particularly well suited for low-light capture conditions, fast frame rates or short exposure times where the SNR of the individual frames is low. It relies on registration of adjacent frames and denoising via averaging and self-similarity methods. Knowledge of the vehicle velocity vector, along with the camera configuration and capture parameters provide an estimate of the relative translation, in pixels, between the low-resolution images of the moving vehicle across adjacent frames, which can then be used to perform image registration, prior to performing denoising via averaging. Image noise produces variations in color information and is typically produced by the sensor and circuitry of the image acquisition device. Given its random nature, noise is typically modeled as an additive random variable. Assuming a multiplicity of noisy images $f_i(m,n)$ of a scene $g(m,n)$ are available, that is $f_i(m,n)=g(m,n)+\eta_i(m,n)$ for $i=1, 2, \ldots, M$ for some integer M. A common assumption is for the noise to be zero-mean Gaussian with standard deviation $\sigma$ and independent and identically distributed, that is $\eta_i(m,n)\sim N(0, \sigma^2)$. As the average of multiple noisy images $f(m,n)$ is computed, that is, $f(m,n)=\Sigma f_i(m,n)/M=g(m,n)+\Sigma\eta_i(m,n)/M$, it can be seen that the average image is now affected by a noise factor $\eta(m,n)=\Sigma\eta_i(m,n)/M$ which is distributed as $\eta(m,n)\sim N(0, \sigma^2/M)$. In other words, the variance or power of the noise signal is effectively decreased as the average of multiple noisy images is computed. Before an average can be computed, registration between the multiple noisy images is performed in accordance with the procedure described above and illustrated in FIG. 6. In the case where relative pixel displacements are not integer relative to the image lattice, well-known interpolation techniques to recover matching samples that fall outside the lattice (solid circles and triangles) from measured samples (empty circles and triangles).

A combination of the de-blurring, denoising, and super resolution methods are also possible.

Based on the foregoing, it can be appreciated that a number of embodiments, preferred and alternative, are disclosed herein. For example, in one embodiment, an image enhancement system can be implemented. Such a system can include an image capture module configured to obtain video data, an image extraction module operably connected to said image capture module and configured to extract at least one image from said video data, a vehicle detection module operably connected to said image extraction module and configured to detect a location of a target vehicle within said at least one image, and a vehicle-velocity aware enhancement module operably connected to said image extraction module and configured to enhance said at least one image based on a velocity of said target vehicle.

In another embodiment a velocity determination module can be provided and operably connected to the vehicle detection module and configured to determine the velocity of the target vehicle in image pixel coordinates. In still another embodiment, an infraction detection module can be provided and operably connected to the image capture module and configured to detect a violation of a traffic law by the target vehicle. In yet another embodiment, the image capture module is a video camera. In an additional embodiment, a trigger device is provided and operably connected to the image capture module and configured to indicate the occurrence of predefined events in a monitoring area. In a further embodiment, the vehicle-velocity aware enhancement module enhances at least one image utilizing velocity-aware de-blurring. In still another embodiment, the vehicle-velocity aware enhancement module enhances at least one image utilizing velocity-aware multi-frame super-resolution.

In an alternate embodiment, a non-transitory computer-usable medium for velocity-aware image enhancement containing computer executable instructions can be implemented. In a further embodiment, a computer implemented method for velocity aware image enhancement can be provided. Such method or instructions can include, for example, obtaining video data utilizing an image capture module, extracting at least one image from the video data utilizing an image extraction module, detecting a location of a target vehicle within the at least one image utilizing a vehicle detection module, and enhancing the at least one image based on a velocity of said target utilizing a vehicle-velocity aware enhancement module.

In another embodiment, such method or instructions can further include determining the velocity of the target vehicle in image pixel coordinates utilizing a velocity determination module. In a further embodiment, such method or instructions can include detecting a violation of a traffic law by said target vehicle utilizing an infraction detection module. In still another embodiment, such method or instructions can include indicating the occurrence of predefined events in a monitoring area utilizing a trigger device. In yet another embodiment, such method or instructions can include enhancing the at least one image utilizing velocity-aware de-blurring. In still another embodiment, such method or instructions can include enhancing the at least one image utilizing velocity-aware multi-frame super-resolution.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A computer-implemented method comprising:
   obtaining video data wherein a video camera imaging a road produced the video data;
   extracting from the video data an image of a vehicle wherein the vehicle is moving;
   determining a location wherein the location is the vehicle's location within the image of the vehicle;
   obtaining a velocity estimate of the vehicle's speed and direction on the road, wherein the velocity estimate is obtained from a microwave detector or the velocity estimate is assumed according to historical speed averages; and
   producing an enhanced image based at least in part on the image and the velocity estimate wherein the enhanced image shows at least a portion of the vehicle.

2. The computer-implemented method of claim 1 further comprising:
   extracting from the video data a second image of the vehicle; and
   determining a second location wherein the second location is the vehicle's location within the second image of the vehicle;
   wherein the velocity estimate is determined at least in part on the location and the second location.

3. The computer-implemented method of claim 1 further comprising:
   extracting from the video data a second image of the vehicle; and
   registering the image and the second image on a lattice, wherein the lattice is higher resolution than the image and the second image;
   wherein the enhanced image is a super-resolution image constructed on the lattice from the video data.

4. The computer-implemented method of claim 1 further comprising:
   extracting from the video data a plurality of additional images of the vehicle; and
   performing image registrations of the image of the vehicle and the additional images of the vehicle wherein the image registrations are based at least in part on the velocity estimate;
   wherein the enhanced image is produced by averaging the image of the vehicle and the additional images of the vehicle.

5. The computer-implemented method of claim 1 further comprising:
   estimating a plurality of point spread functions for a plurality of pixels wherein the image comprises the pixels and wherein each of the point spread functions is based at least in part on the velocity estimate, a camera configuration, a capture parameter, and an assumption of linear motion;
   wherein the enhanced image is produced by deconvolving the image with the point spread functions.

6. The computer-implemented method of claim 1 further comprising:
   estimating a point spread function wherein the point spread function is based at least in part on the velocity estimate, a camera configuration, a capture parameter, and an assumption of linear motion;
   obtaining a frequency domain representation of the image; and
   determining a frequency domain representation the point spread function;
   wherein the enhanced image is produced by frequency domain deconvolution expressed as a fraction having a numerator and a denominator, wherein the numerator comprises the frequency domain representation of the image, and wherein the denominator comprises the frequency domain representation the point spread function.

7. The computer-implemented method of claim 1 further comprising:
   estimating a point spread function in the frequency domain wherein the point spread function is based at least in part on the velocity estimate, a camera configuration, a capture parameter, and an assumption of linear motion;
   determining a complex conjugate of a frequency domain representation the point spread function;
   determining a frequency domain representation of the image;
   determining an image power spectral density that is the power spectral density of the image; and
   determining a noise power spectral density that is the power spectral density of additive noise;
   wherein the enhanced image is produced by frequency domain deconvolution expressed as a fraction having a numerator and a denominator, wherein the numerator comprises the product of the frequency domain representation of the image, image power spectral density, and the complex conjugate, and wherein the denominator comprises the sum of the noise power spectral density with the product of the squared magnitude of the complex conjugate and the image power spectral density.

8. The computer-implemented method of claim 1 further comprising:
   extracting from the video data at least one additional image of the vehicle; and
   explicitly calculating an image domain vector field based on the image and the at least one additional image wherein the image domain vector field comprises a plurality of image domain displacement vectors wherein the displacement vectors describe the displacement of the vehicle across the sequence of frames.

9. The computer-implemented method of claim 1 further comprising:
   obtaining a plurality of vehicle aware velocity parameters estimated in pixel units and based at last in part on a camera configuration and an exposure time;
   wherein the enhanced image is produced by velocity aware de-blurring comprising sharpening the image based on the pixel-wise vehicle velocity parameters.

10. A non-transitory computer-usable medium for producing an enhanced image, the computer-usable medium embodying computer program code, the computer program code comprising computer executable instructions configured for:
   obtaining image data comprising a first image showing a vehicle moving on a road;
   extracting the first image from the image data;
   determining a first location that is the vehicle's location within the first image;
   obtaining a velocity estimate of the vehicle's velocity;

producing an enhanced image based at least in part on the first image and the velocity estimate wherein the enhanced image shows at least a portion of the vehicle; and receiving vehicle location information about the vehicle from a non-video-based triggering device, wherein the vehicle location information is in real world coordinates.

11. The non-transitory computer-usable medium of claim 10 further comprising computer executable instructions configured for mapping the vehicle location information into pixel coordinates.

12. The non-transitory computer-usable medium of claim 10 further comprising computer executable instructions configured for:

estimating a frequency domain representation of the point spread function wherein the point spread function is based at least in part on the velocity estimate, a camera configuration, a capture parameter, and an assumption of linear motion;

determining a conjugate wherein the conjugate is a complex conjugate of the frequency domain representation the point spread function;

determining a frequency domain representation of the image;

determining an image power spectral density that is the power spectral density of the image;

determining a noise power spectral density that is the power spectral density of additive noise;

calculating a frequency domain representation of the enhanced image by evaluating a fraction comprising a dividend and a divisor, wherein the dividend comprises the product of the frequency domain representation of the image, image power spectral density, and the conjugate, and wherein the divisor comprises the sum of the noise power spectral density and the product of the squared magnitude of the conjugate and the image power spectral density; and producing the enhanced image based at least in part on the frequency domain representation of the enhanced image.

* * * * *